Oct. 27, 1953    A. S. WATKINS ET AL    2,656,568
INJECTION MOLDING APPARATUS
Filed March 15, 1951    3 Sheets-Sheet 1
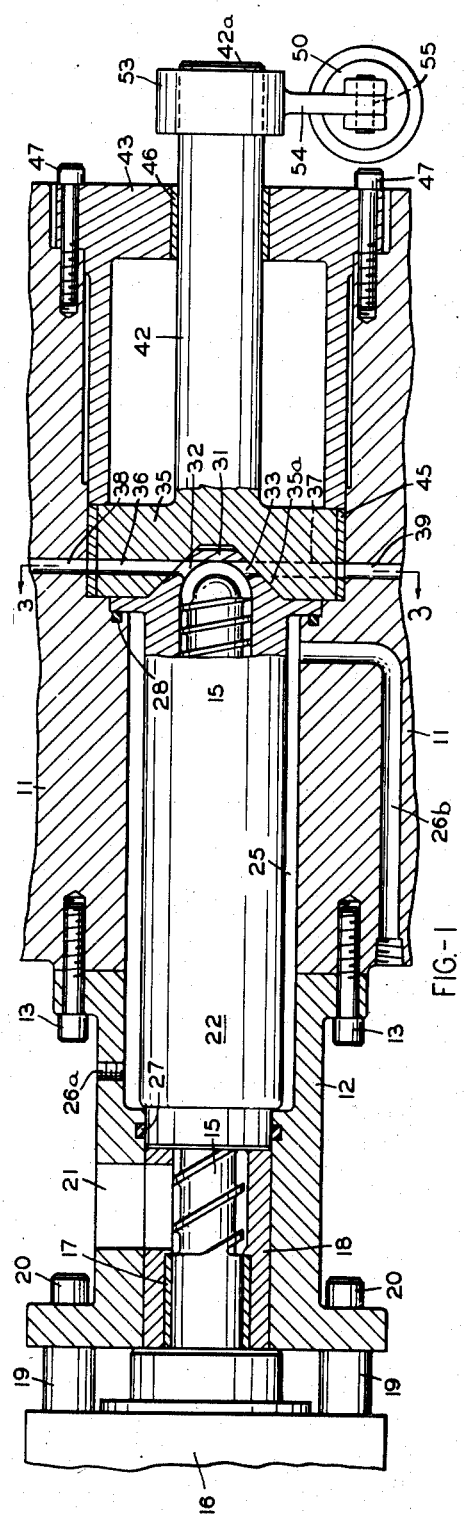
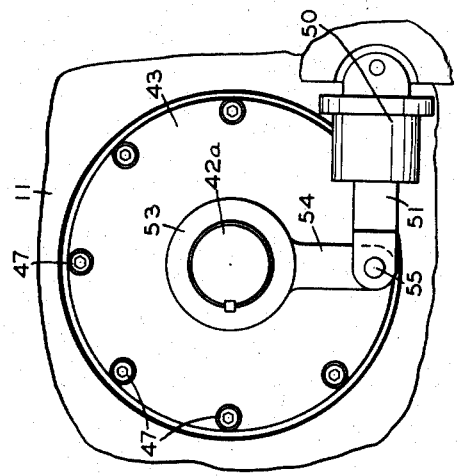
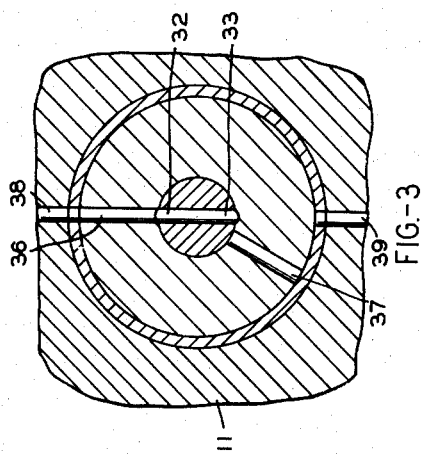
*INVENTORS*
ARTHUR S. WATKINS &
GEORGE L. WARSACK
BY
*Hyde, Meyer, Baldwin & Doran*
ATTORNEYS Oct. 27, 1953

A. S. WATKINS ET AL 2,656,568

INJECTION MOLDING APPARATUS

Filed March 15, 1951

*INVENTORS*
ARTHUR S. WATKINS &
GEORGE L. WARSACK

BY

*Hyde, Meyer, Baldwin & Doran*
ATTORNEYS

Oct. 27, 1953

A. S. WATKINS ET AL 2,656,568

INJECTION MOLDING APPARATUS

Filed March 15, 1951

*INVENTORS*
ARTHUR S. WATKINS &
GEORGE L. WARSACK

BY

*Hyde, Meyer, Baldwin & Doran*

ATTORNEYS

Patented Oct. 27, 1953

2,656,568

UNITED STATES PATENT OFFICE 2,656,568

INJECTION MOLDING APPARATUS

Arthur S. Watkins and George L. Warsack, Port Clinton, Ohio, assignors to Produx Corporation, Port Clinton, Ohio, a corporation of Ohio Application March 15, 1951, Serial No. 215,839

7 Claims. (Cl. 18—30)

This invention pertains to injection molding apparatus and more particularly to a feeding head for such apparatus by means of which a mass of plastic material may be introduced under pressure into a mold cavity.

An object of the invention is to provide a feeding head which may be used in conjunction with a plurality of molds which are successively used and re-used.

Another object is to provide a feeding head having a positionable element therein whereby to direct the flow of a plastic material into any one of a plurality of molds.

Another object is to provide such a device in which plastic material is advanced into one of a plurality of molds through an integral sleeve and nozzle and an oscillatable valve by a screw conveyor.

Another object is to provide a feeding head in which the position of an oscillatable valve determines which of a plurality of molds shall be filled with a plastic material.

Another object is to provide such a device in which an oscillatable valve is positioned by fluid power means.

Further objects and advantages of the invention will become apparent from the following description of several embodiments thereof.

In the drawings, in which like numerals refer to like parts throughout,

Fig. 1 is a longitudinal vertical sectional view of one embodiment of the invention;

Fig. 2 is an end view of the device shown in Fig. 1;

Fig. 3 is a sectional view taken on the line 3—3 of Fig. 1;

Figure 4:
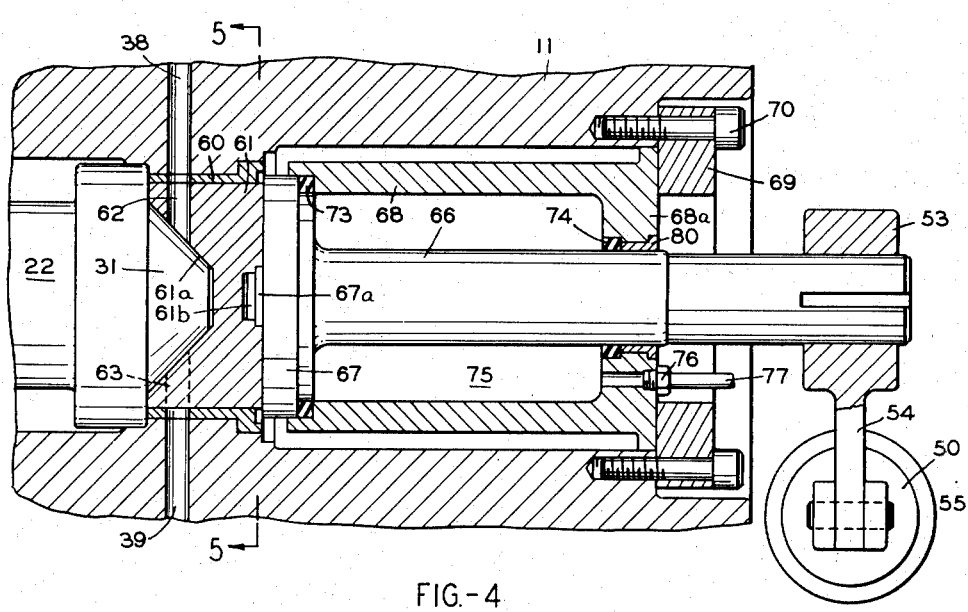
Fig. 4 is a fragmentary sectional view similar to Fig. 1 but showing another method of retaining the oscillatable valve firmly against the nozzle.

The preferred embodiments of the invention hereinafter described are adapted to operate in conjunction with two molds. However, this is not to be construed as a limitation since, as will be pointed out, the invention may be easily adapted for use with any number of molds. Furthermore, it is to be understood that the terms and phrases used to describe the preferred embodiments illustrated herein are descriptive and illustrative only and are not to be construed as limiting the invention.

Speaking first generally, the invention relates to a screw conveyor rotatable within a fixed sleeve and nozzle. Plastic material is advanced from a hopper feed entrance by the screw conveyor, and forced under pressure through one of two diametrically opposed sprues in a nozzle enclosing the tip of the conveyor. A positionable valve, which bears against the nozzle, has two sprues therein which are individually but not simultaneously registerable with the nozzle sprues. The radial position of the valve determines which of the nozzle sprues will be registrable with a valve sprue and, therefore, which mold will be filled through casting sprues permanently aligned with the nozzle sprues. The position of the valve is controlled by mechanical means, in this case, a hydraulic or air cylinder.

Referring first to the embodiment shown in Figs. 1, 2 and 3, the conveyor, nozzle, valve and other principal parts are contained within a longitudinal bore which extends throughout a casting 11 and a housing 12, attached to the casting by the bolts 13. The screw conveyor 15 extends from and is rotated by a transmission mechanism, designated generally by the numeral 16, and is supported within the longitudinal bore by a sleeve bearing 17 and a larger sleeve 18. Power is supplied to the transmission mechanism 16 by an electric motor (not shown). The spacers 19 and the bolts 20 hold the transmission mechanism in place. An aperture 21, through the housing 12 and the sleeve 18, provides means whereby plastic material may be fed from a feed hopper (not shown) to the screw conveyor 15. The screw conveyor is surrounded by a sleeve 22 which terminates in a portion 31 hereby designated a nozzle, for purposes of description. If desired, the sleeve and nozzle may be made separately and bolted or otherwise joined, but, in this instance, are a unitary structure.

Provision may be made for a temperature-controlling water jacket 25 around the sleeve 22, the water being introduced and removed through the lines 26a and 26b. The seals 27 and 28 at the rear and forward ends of the sleeve, respectively, insure against leakage of water from the jacket.

The internal diameter of the sleeve 22 is just slightly larger than the major diameter of the screw conveyor 15, and therefore, plastic material fed into the conveyor through the aperture 21 is advanced through the sleeve to the nozzle 31, and through two sprues 32 and 33 which extend through the nozzle and, in this case, are diametrically opposed. Bearing against and rotatable with respect to the nozzle 31 is a valve 35, having a bearing surface 35a which is complementary to the outer surface of the nozzle 31. Two sprues 36 and 37 in the valve 35 are registrable with the nozzle sprues 32 and 33 respectively. However, the nozzle sprues 32 and 33 are diametrically opposed whereas the valve sprues 36 and 37 are not so arranged, and are therefore not simultaneously registrable with the respective nozzle sprues (Fig. 3). The sprues 38 and 39 through the casting 11 are aligned with the nozzle sprues 32 and 33. Thus it is seen that the valve 35, being interposed between the nozzle and casting, serves in a manner somewhat like a shutter. In one position (Fig. 3), it completes the path from the nozzle sprue 32 through to casting sprue 38 and, in its other position, from the nozzle sprue 33 to the casting sprue 39. The casting sprues are, of course, connected to molds into which the plastic material is fed after being forced by the screw conveyor through the nozzle, valve, and casting sprues.

Attached to or, in this case, made integral with the valve 35 is a shaft 42. The entire assembly is held in place by a pressure ring 43 whose inner edge bears against the valve, which in turn bears against the nozzle. A sleeve 45, having apertures aligned with the casting sprues, surrounds the valve and a sleeve bearing 46 surrounds the shaft 42 where it passes through the end wall of the pressure ring 43. The pressure ring is attached to the casting 11 by means of bolts 47.

As previously mentioned, the position of the valve 35 determines which of the molds will be filled. Therefore, the invention contemplates the use of means operatively connected to the shaft 42 where by its position may be varied. In this case, such means comprises a fluid power cylinder 50 having a piston rod 51. A collar 53 is keyed to the external end 42a of the shaft 42 and a depending arm 54 is connected to the bifurcated end portion of the cylinder rod 51 as at 55. The cylinder may be used in conjunction with any suitable well-known valve to vary the position of the piston rod 51 and therefore rotate the shaft 42 through various positions.

Figure 5:
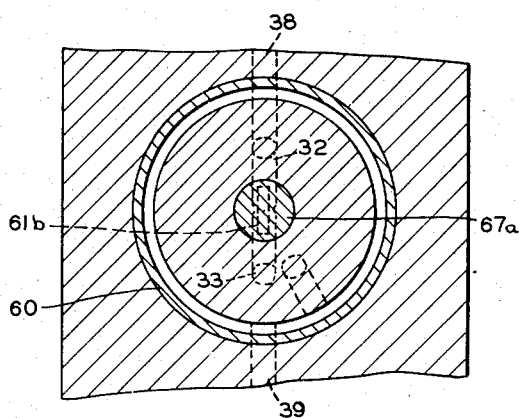
Fig. 5 is a sectional view taken on the line 5—5 of Fig. 4.

In Figs. 4 and 5 there is shown an adaptation of the invention in which fluid pressure means is used to hold the valve firmly against the nozzle. All parts except those hereinafter specifically mentioned are the same as the corresponding parts in the embodiment described with reference to Figs. 1, 2 and 3. Also, the method of operation of this device is in all respects the same as that previously described.

The nozzle 31 is of the same shape and construction as that previously described and has therein two diametrically opposed sprues 32 and 33 which are aligned with the casting sprues 38 and 39 respectively, all as previously described. Interposed between the nozzle and the casting and contained within a sleeve 60 is a rotatably positionable valve 61 having therein two sprues 62 and 63 which are individually, but not simultaneously, registrable with the nozzle sprues 32 and 33, respectively. The valve 61 has a bearing surface 61a machined thereon which is retained in contact with the outer surface of the nozzle 31 by fluid pressure means. Such means comprise a shaft 66 which is attached to a disk-like element 67 having on the front surface thereof a jaw 67a which fits a recess 61b cut into the rear surface of the valve 61. These parts are retained in position by a sleeve 68 spaced apart from the shaft 66 and by a ring 69 which is attached to the casting 11 by means of bolts 70. Leakage is prevented by the seals 73 and 74. Thus, the disk-like element 67 serves as an axially moveable and rotatable end wall for the cylindrical structure comprising the sleeve 68 and its fixed end wall 68a. Fluid, in this case oil, is introduced under pressure into the interior of the sleeve, designated generally by the numeral 75, through a suitable fitting 76 to which an oil line 77 is attached. By using a constant pressure fluid supply, it is possible to maintain a uniform pressure between the nozzle and the valve and, as the parts wear, insure that they will still be retained in close contact.

The shaft 66 extends through a bronze bearing 80 in the transverse end wall 68a of the sleeve 68 to the outside of the device where a collar 53 having a depending arm 54 is keyed to it. As in the first described embodiment, the arm 54 is rotated about the drive shaft axis by a fluid power cylinder.

The operation of this embodiment is the same as that of the first-described embodiment. Plastic material is introduced into the rear portion of the device and is advanced under pressure by the screw conveyor through the sleeve into the nozzle. The position of the rotatable or oscillatable valve determines which mold path is open and the plastic material is forced through the aligned sprues into the mold. When the mold is filled, as determined visually by an operator, the operator changes the path of feed by causing the piston in the hydraulic cylinder to assume a different position, and the process is then repeated.

Figure 6:
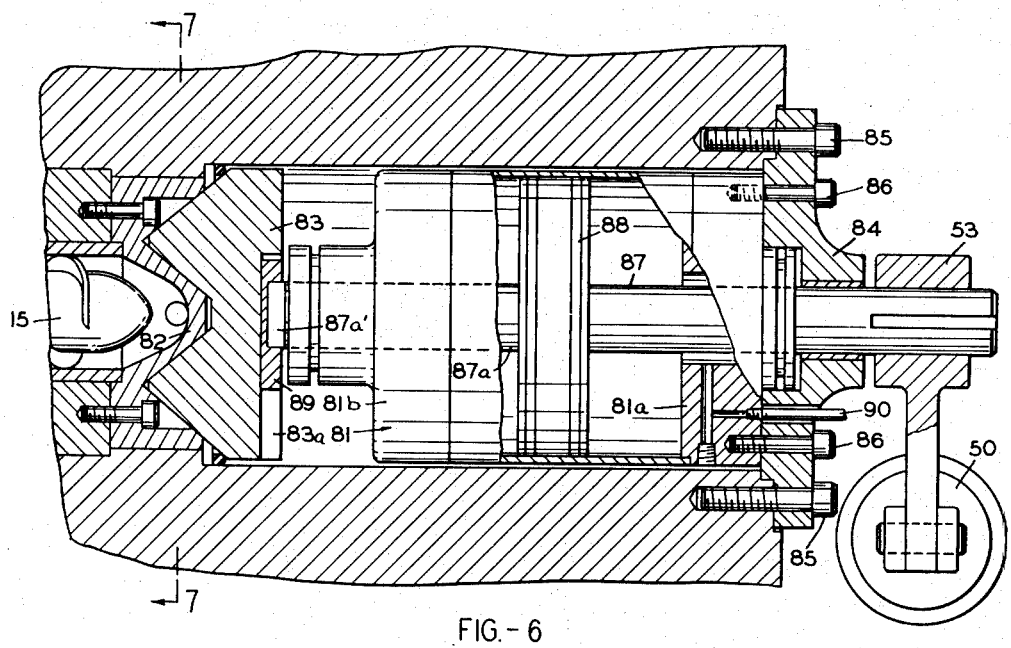
Fig. 6 is a fragmentary sectional view similar to Fig. 1 and showing still another method of retaining the oscillatable valve firmly against the nozzle.
Figure 7:
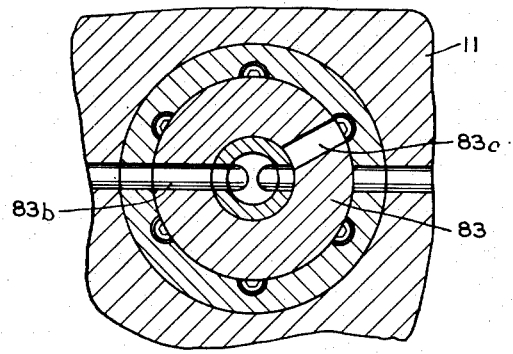
Fig. 7 is a sectional view taken on the line 7—7 of Fig. 6.

In Figs. 6 and 7 a piston and cylinder 81 is used to maintain a uniform pressure between the nozzle 82 and the valve 83.

A supporting plate 84 is bolted to the casting 11 by bolts 85 and the end head 81a of cylinder 81 is bolted to the supporting plate 84 by bolts 86. A piston rod 87, secured to piston 88, extends through the end head 81a and the supporting plate 84 and the collar 53 is keyed to the outer end of the piston rod 87. A second piston rod 87a, in axial alignment with the piston rod 87, is also secured to piston 88 and extends through the end head 81b. The piston rod 87a is flattened at 87a' which fits a recess in an elongated member 89. The member 89 rides in a slot 83a in valve 83 and this construction permits smooth operation of the valve 83 if there is a slight misalignment of the valve 83 and piston rod 87a.

Fluid pressure is admitted to the cylinder 81 through pipe 90 and urges the piston 88 and therefore the piston rods 87 and 87a to the left, as viewed in Fig. 6, to maintain a uniform pressure between the valve 83 and nozzle 82.

The valve 83 is oscillated, to align one of the sprues 83b or 83c with one of the nozzle sprues, by oscillating the piston rod 87 by means of the fluid power cylinder 50 as previously described. Oscillation of the piston rod 87 will, of course, cause oscillation of the piston 88 and piston rod 87a to therefore oscillate the valve 83.

Although the embodiments described herein are adapted for use in conjunction with two molds, changes may be easily made whereby to adapt the invention for use with any given number of molds. Such changes would involve mere using of a nozzle and valve having the proper number of sprues and having the fluid power positioning means adapted to position the valve at the requisite number of points. Various other changes, of course, may be made by one skilled in the art without departing from the spirit of the invention as defined by the appended claims.

What is claimed is:

1. In an injection molding apparatus, a feeding head comprising a screw conveyor, a fixed sleeve surrounding said screw conveyor and having a nozzle portion provided with a plurality of spaced sprues, an oscillatable valve having a bearing surface engaging said nozzle portion and being provided with a plurality of spaced sprues each of which is registerable with one said nozzle portion sprue, and positioning means adapted to oscillate said valve whereby in any one of a plurality of predetermined positions to register one only of said valve sprues with one said nozzle sprue.

2. In an injection molding apparatus, a feeding head comprising a screw conveyor, a fixed sleeve surrounding said screw conveyor and having a nozzle portion provided with a plurality of spaced sprues, an oscillatable valve having a bearing surface engaging said nozzle portion and being provided with a plurality of spaced sprues each of which is registerable with one said nozzle portion sprue, and positioning means comprising a fluid power cylinder adapted to oscillate said valve whereby in any one of a plurality of predetermined positions to register one only of said valve sprues with one said nozzle sprue.

3. In an injection molding apparatus, a feeding head comprising a screw conveyor, a fixed sleeve surrounding said screw conveyor and having a nozzle portion provided with a plurality of spaced sprues, an oscillatable valve having a bearing surface engaging said nozzle portion and being provided with a plurality of spaced sprues each of which is registerable with one said nozzle portion sprue, pressure means retaining said bearing surface in contact with said nozzle portion, and positioning means adapted to oscillate said valve whereby in any one of a plurality of predetermined positions to register one only of said valve sprues with one said nozzle sprue.

4. In an injection molding apparatus, a feeding head comprising a screw conveyor, a fixed sleeve surrounding said screw conveyor and having a nozzle portion provided with a plurality of spaced sprues, an oscillatable valve having a bearing surface engaging said nozzle portion and being provided with a plurality of spaced sprues each of which is registerable with one said nozzle portion sprue, pressure means retaining said bearing surface in contact with said nozzle portion, said pressure means comprising a cylindrical structure having an axially movable end wall bearing against said valve and having fluid introduced under pressure into the interior of said cylindrical structure, and positioning means adapted to oscillate said valve whereby in any one of a plurality of predetermined positions to register one only of said valve sprues with one said nozzle sprue.

5. In an injection molding apparatus, a feeding head comprising a screw conveyor, a fixed sleeve surrounding said screw conveyor and having a nozzle portion provided with a plurality of spaced sprues, an oscillatable valve having a bearing surface engaging said nozzle portion and being provided with a plurality of spaced sprues each of which is registerable with one said nozzle portion sprue, pressure means retaining said bearing surface in contact with said nozzle portion, said pressure means comprising a cylindrical structure having an axially movable end wall bearing against said valve and having fluid introduced under pressure into the interior of said cylindrical structure, and positioning means comprising a fluid power cylinder adapted to oscillate said valve whereby in any one of a plurality of predetermined positions to register one only of said valve sprues with one said nozzle sprue.

6. In an injection molding apparatus, a feeding head comprising a screw conveyor, a fixed sleeve surrounding said screw conveyor and having a nozzle portion provided with a plurality of spaced sprues, an oscillatable valve having a bearing surface engaging said nozzle portion and being provided with a plurality of spaced sprues each of which is registerable with one said nozzle portion sprue, pressure means retaining said bearing surface in contact with said nozzle portion, said pressure means comprising a piston and cylinder structure, a piston rod secured to said piston and adapted to engage said valve, said piston and said piston rod being axially movable in valve engaging direction upon the introduction of fluid under pressure into the interior of said cylinder, and positioning means adapted to oscillate said valve to any one of a plurality of predetermined positions to register one only of said valve sprues with one said nozzle sprue.

7. In an injection molding apparatus, a feeding head comprising a screw conveyor, a fixed sleeve surrounding said screw conveyor and having a nozzle portion provided with a plurality of spaced sprues, an oscillatable valve having a bearing surface engaging said nozzle portion and being provided with a plurality of spaced sprues each of which is registerable with one said nozzle portion sprue, pressure means retaining said bearing surface in contact with said nozzle portion, said pressure means comprising a piston and cylinder structure, a piston rod secured to said piston and adapted to engage said valve, said piston and said piston rod being axially movable in valve engaging direction upon the introduction of fluid under pressure into the interior of said cylinder, and positioning means comprising a fluid power cylinder adapted to oscillate said valve to any one of a plurality of predetermined positions to register one only of said valve sprues with one said nozzle sprue.

ARTHUR S. WATKINS.
GEORGE L. WARSACK.

References Cited in the file of this patent
UNITED STATES PATENTS

| Number | Name | Date |
|---|---|---|
| 1,960,515 | Shield | May 29, 1934 |
| 2,422,758 | Temple | June 24, 1947 |